United States Patent Office.

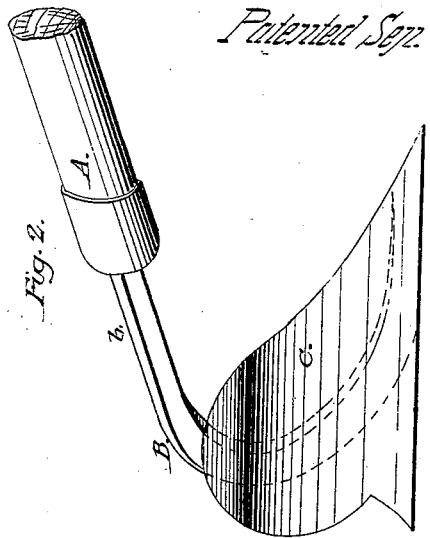
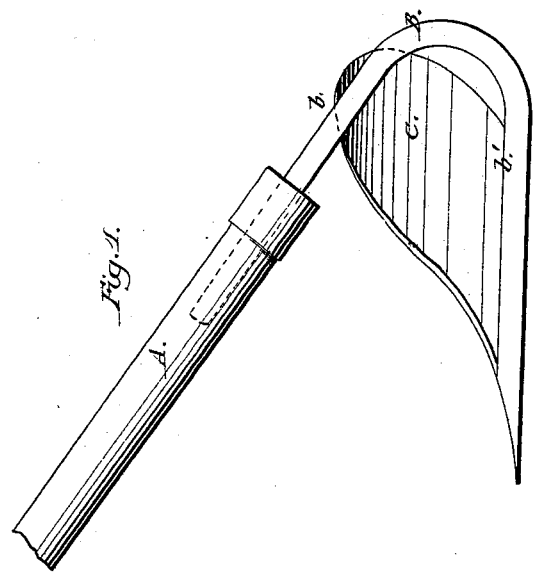

LE ROY McWHINNEY, OF WINTERSET, IOWA.

Letters Patent No. 95,367, dated September 28, 1869.

IMPROVEMENT IN HAND-PLOWS.

The Schedule referred to in these Letters Patent and making part of the same.

*To all whom it may concern:*

Be it known that I, LE ROY McWHINNEY, of Winterset, in the county of Madison, and State of Iowa, have invented a new and useful Improved Hand-Plow, for use in gardens; and I do hereby declare that the following is a full, clear, and exact description of the same, reference being had to the annexed drawing, making part of this specification, in which—

Figure 1 is a side elevation, and

Figure 2, an elevation of the opposite side.

The same letters in all the figures represent the same parts.

My invention relates to a hand-plow, especially designed for use in cultivating gardens, as a substitute for the ordinary garden-hoe.

In the annexed drawing—

A is the handle, and

B, a rod of iron, bent so that the shank $b$ shall stand at an angle of about forty-five degrees when the portion $b'$ is horizontal.

A mould-board, C, in the form of an ordinary plow, is welded to the point of the bar, and, extending back, the upper portion is curved in proper form, to easily turn over the earth, precisely as the ordinary field-plow does.

This plow will be found to be of very convenient use in cultivating between the rows of vegetables or plants, in a kitchen or flower-garden, as it may be easily drawn by hand, and the passage of the plow will loosen the soil and turn under the weeds.

What I claim as my invention, and desire to secure by Letters Patent, is—

As an article of manufacture, a hand-plow, composed of parts A, B, and C, constructed substantially as set forth.

In testimony whereof, I have signed my name to this specification, in the presence of two subscribing witnesses.

L. R. McWHINNEY.

Witnesses:
  D. P. HOLLOWAY,
  C. F. CLAUSEN.